United States Patent [19]
Hill et al.

[11] 3,768,560
[45] Oct. 30, 1973

[54] WATERFLOOD OIL RECOVERY WITH CHROMATOGRAPHICALLY BALANCED SURFACTANT AND A THICKENER

[75] Inventors: Harold J. Hill; David Ross Thigpen, both of Houston, Tex.

[73] Assignee: Shell Oil Company, Houston, Tex.

[22] Filed: Oct. 26, 1971

[21] Appl. No.: 192,116

[52] U.S. Cl................................. 166/274, 166/273
[51] Int. Cl.............................................. E21b 43/16
[58] Field of Search............................ 166/273, 274

[56] References Cited
UNITED STATES PATENTS

| | | | |
|---|---|---|---|
| 3,658,130 | 4/1972 | Davis................................. | 166/273 |
| 3,126,952 | 3/1964 | Jones................................. | 166/274 |
| 3,348,611 | 10/1967 | Reisberg............................. | 166/274 |
| 3,204,694 | 9/1965 | Johnson, Jr. et al................ | 166/274 |
| 3,421,582 | 1/1969 | Fallgatter........................... | 166/273 |
| 3,434,542 | 3/1969 | Dotson et al. ..................... | 166/273 |
| 3,443,636 | 5/1969 | Gogarty............................. | 166/273 |
| 3,478,823 | 11/1969 | Murphy.............................. | 166/274 |
| 3,634,305 | 1/1972 | Johnson et al..................... | 166/273 |
| 3,687,199 | 8/1972 | Jennings............................ | 166/273 |

*Primary Examiner*—Marvin A. Champion
*Assistant Examiner*—Jack E. Ebel
*Attorney*—Harold L. Denkler et al.

[57] ABSTRACT

A waterflood oil recovery process in which an aqueous liquid that contains a surfactant and a thickener is injected into a reservoir to displace oil toward a recovery location is improved by coordinating the types and proportions of the components. The thickener concentration is adjusted to provide a mobility at least substantially as low as that of the fluids in the reservoir, and the surfactant concentration is adjusted to provide a rate of frontal advance of surfactant that substantially equals the rate of frontal advance of thickener.

13 Claims, 10 Drawing Figures

3,768,560

WATERFLOOD OIL RECOVERY WITH CHROMATOGRAPHICALLY BALANCED SURFACTANT AND

BACKGROUND OF THE INVENTION

This invention relates to an aqueous fluid oil displacement process and/or a waterflood oil recovery process in which an aqueous liquid is injected into a subterranean reservoir in order to displace reservoir fluid away from the point of injection and/or toward a location from which oil is recovered.

In a waterflood oil recovery process, an aqueous liquid is usually injected in the form of a chemical slug that is followed by a thickened slug and a drive liquid. The chemical slug is primarily an active surfactant system containing a surfactant that substantially eliminates the interfacial tension between it and the reservoir oil and a thickener or mobility control agent that provides a chemical slug mobility substantially as low as the reservoir oil mobility. The thickened slug is primarily a mobility-controlling liquid having a mobility within the reservoir that is substantially as low as that of the chemical slug and reservoir fluid near the front edge of the thickened slug and is substantially as high as that of the drive liquid near the back edge of the thickened slug. The drive liquid is substantially any aqueous liquid that is economically available at the field location.

The present invention is, at least in part, premised on the discovery that, in such an oil recovery process, the chemical slug mobility relative to the mobility of the reservoir oil and/or other fluids flowing immediately ahead of it may increase during the passage of the slug through the reservoir rock and this relative increase in mobility of the slug may result in the bypassing of a substantial quantity of oil. Such an increase in relative mobility of the chemical slug occurs: (1) when relatively excessive adsorption of the mobility control agent depletes that agent from the frontal part of the chemical slug or, alternatively, (2) when rela-tively excessive adsorption of surfactant allows a solution of mobility control agent to build up ahead of the chemical slug. In either case, the resulting unstable mobility conditions result in bypassing substantial amounts of oil. But, such a chemical slug can be formulated to have both an adequately low mobility and a suitable chromatographic balance by a proper adjustment of the ratio of the concentrations of the thickener and the surfactant components of the chemical slug. When both an adequately low mobility and a chromatographic balance are achieved, the oil is not bypassed. The present invention is useful in a well treatment as well as in an oil recovery type of a chemical flood oil displacement process. In a chemical flood oil diplacement process, a relatively large chemical slug, preferably comprising an aqueous surfactant system, is injected into a subterranean reservoir to displace oil-containing reservoir fluid into a producing location within the reservoir. In a well treatment process, a relatively small chemical slug is injected from a ring (which becomes thinner as it is displaced away from the injection well) that soon breaks up and becomes dispersed within the reservoir, usually when the ring has been displaced by from about 5 to 10 feet from the injection well. In the oil recovery process, the chemical slug is large enough to form a ring that remains substantially intact as it is displaced from an injection location to a production location, usually involving distances of from about 50 feet to several hundred feet.

SUMMARY OF THE INVENTION

In a process for displacing oil within a subterranean reservoir by injecting an aqueous liquid that contains a surfactant and a thickener into an oil-containing reservoir, the concentration of the thickener is adjusted to provide an aqueous liquid mobility at least substantially as low as that of the reservoir fluids, and the concentration of the surfactant is adjusted to provide a rate of surfactant frontal advance substantially equalling the rate of thickener frontal advance. In a water-flood oil recovery process, the oil and the chemical slug (i.e., the surfactant and thickener-containing slug of aqueous liquid) are displaced toward an oil recovery location by following the injection of the chemical slug by an injection of a thickened aqueous slug and an aqueous drive liquid that are injected into the reservoir in sequence immediately behind the chemical slug.

In a preferred embodiment of the invention, the chemical slug contains a material that retards emulsification and/or reduces viscosity of emulsions which, with some crude oils, may be formed as a result of an interaction between the chemical slug and the crude oil within the reservoir. When an emulsion formed at the interface between the chemical slug and the reservoir crude oil is both stable with respect to time and more viscous that the chemical slug, the emulsion tends to be by-passed, with a resultant loss of both oil and chemical slug. In the preferred embodiment the problem is eliminated by including in the chemical slug additional chemicals selected to (1) prevent formation of emulsions, (2) decrease coalesence time of the emulsion to a level such that it breaks within minutes after it is formed and/or (3) reduce viscosity of the emulsion to or below the viscosity of the chemical slug.

DESCRIPTION OF THE INVENTION

Figure 1:
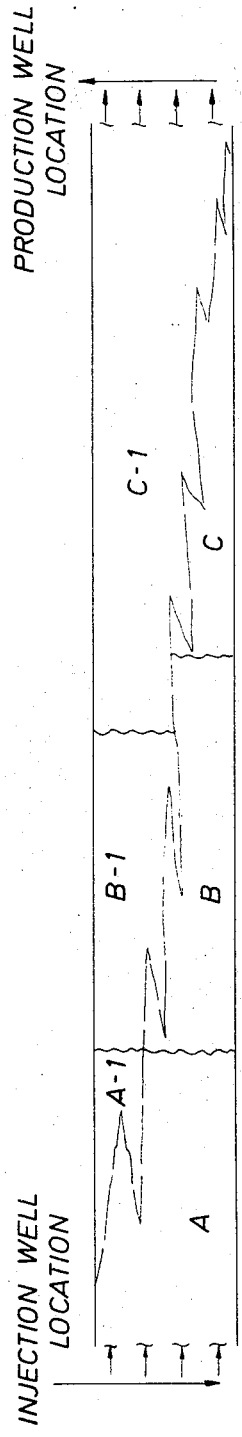
FIGS. 1–3 are schematic illustrations of the paths and locations of fluids in a reservoir being water-flooded by processes of types previously proposed.

The components of a chemical slug used in the present invention can include substantially any mixture of surfactants and thickeners, along wi electrolytes, and-/or cosurfactants, cosolvents, semi-polar materials and emulsion modifiers, that is adapted to form an aqueous chemical slug having an interfacial tension of less than about 0.01 dyne per centimeter against the fluids within an oil containing reservoir. Such compounds can be utilized in combination of components such as those previously proposed for oil displacing chemical slugs.

Preferred surface active and electrolytic components are described in U.S. Pats. such as the J. Reisberg U.S. Pat. 3,330,344 and 3,348,611. Suitable semi-polar organic materials are disclosed in the S. C. Jones U.S. Pat. 3,506,070 and 3,506,071.

The components of a thickened slug and drive fluid that may be injected behind the chemical slug can also comprise thickening agents and aqueous solutions containing combinations of compounds such as those previously proposed for similar uses. Suitable thickeners and drive fluids are described in the patents mentioned above.

Particularly suitable surfactants comprise mixtures of alkali metal salts of petroleum sulfonates (such as alkylaryl sulfonates, alkylated benzene sulfonates, and the like) and sulfated polyoxyalkylated alcohol surfactants. Such petroleum sulfonate surfactants are commercially available, for example, as Petroleum Sulfonates, from Bray Chemical Company, Bryton Sulfonates, from Bryton Chemical Company, Petronates and Pyronates from Sonneborn Division of Witco Chemical Company, Promor Sulfonates, from Mobil Oil Company, and the like. Surfactant sulfates of ethoxylated primary alcohols are sold as Neodols by Shell Chemical Company. Other surfactant sulfates of ethoxylated alcohols are available as Tergitols from Union Carbide, and the like. Particularly suitable mixtures of sulfonate and sulfate surfactants are described in the J. Reisberg, G. Smith, and J. B. Lawson U.S. Pat., 3,508,612.

Suitable water soluble thickeners for use in the chemical slug and the thickened slug comprise water-soluble polymeric materials, such as carboxymethyl cellulose, polyethylene oxide, the high molecular weight salts of polymers containing amide and carboxylate groups that are produced by polymerizing acrylamide (or its homologs, such as methylacrylamide) and partially hydrolyzing the amide groups. Polyelectrolyte thickeners are particularly suitable and partially hydrolyzed polyacrylamides are available under trade names such as Pusher and Separan from Dow Chemical Company, bipolymers are available under trade names such as the Kelzans, from Kelco Company, etc.

In a preferred procedure for practicing the present invention an emulsion modifier is incorporated into the chemical slug. It should be noted, however, that the present process is not limited to the use of an emulsion modifier-containing chemical slug and significant advantages relative to the prior processes are provided by using a chromatographically stable chemical slug that contains no emulsion modifier. Materials which can be used as emulsion modifiers include mono or polyamines, polyethoxylated amines, amides, sulfonamides of water soluble sulfonic acids, water-soluble, oil-insoluble petroleum sulfonates, ketones, alcohols and the like. Such materials are generally useful for facilitating the breaking of oil field emulsions. The lower alcohols such as isobutyl alcohol, polyethoxylated amines such as the Ethoduomeens T/25 or T/20, and water-soluble oil-insoluble petroleum sulfonates such as Pyronate 30 or 50, are particularly suitable.

In general, a chromatographically stable aqueous chemical slug comprises an aqueous liquid (which may optionally contain sufficient dissolved electrolyte and-/or semi-polar material to enhance the activity of the surfactant) containing: (1) sufficient thickener to provide a mobility within an oil reservoir that is substantially as low as that of the oil-containing reservoir fluids and (2) sufficient surfactant to provide a rate of surfactant frontal advance approximately equal to the rate of thickener frontal advance. Such a proportioning of the concentrations of thickener and surfactant is important. It insures that, as the chemical slug moves through the reservoir, each portion maintains a substantially constant ratio of concentration of surfactant to thickener and exhibits a substantially unchanged mobility.

The importance of such a chromatographic stability is illustrated by FIGS. 1 to 4. These figures illustrate the flow paths and distributions of fluids within a swept zone between an injection and a production well in an oil-containing reservoir. In each of the figures: fluids are injected and produced throughout the entire reservoir interval; the locations of interfaces between fluids are indicated by vertical wiggly lines; the fluids which have passed through and are contained in various regions are indicated by the letter designation; and the letters A through D have the meanings:

A. Swept by chemical slug, thickened slug and drive liquid. Now contains drive liquid.

B. Swept by chemical slug, thickened slug and now contains thickened slug.

C. Swept by and now contains chemical slug.

D. Region yet to be swept by chemical slug. Now contains flowing oil and aqueous liquid from chemical slug (depleted of both surfactant and mobility control agent).

FIG. 1 shows the effects of a chemical slug mobility exceeding that of the reservoir fluid. In the illustrated performance, the mobility of the chemical slug is substantially greater than that of the flowing oil and water in reservoir, but the frontal advance rates of the surfactant and mobility control agent are substantially equal; and the mobility of the thickened slug is properly designed to be equal to or less than the mobility of the chemical slug (at B/C interface) and substantially equal to mobility of drive liquid (at A/B interface).

A-1 is a region that has been swept by thickened slug and now contains by-passed oil and drive liquid. B-1 is a region that now contains thickened slug and by-passed oil. C-1 is a region that now contains by-passed oil, formation water and aqueous liquid from chemical slug (depleted of both surfactant and mobility control agent).

Figure 2:
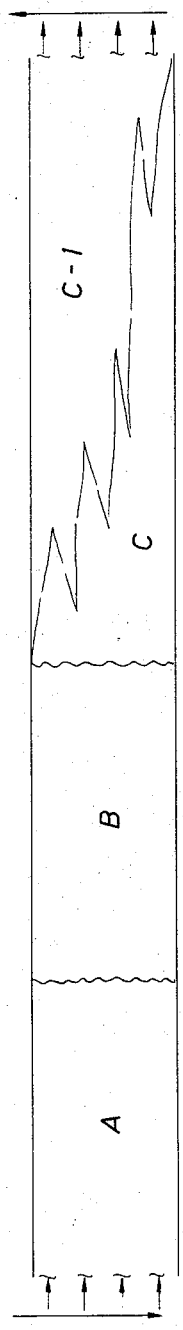

FIG. 2 shows the effects of a frontal advance rate of the surfactant component of the chemical slug exceeding that of the thickening component of that slug. In the illustrated performance the mobility of the injected chemical slug is less than the mobility of the flowing oil and water but the frontal advance rate of the mobility control agent in the chemical slug greatly exceeds the advance rate of surfactant. The mobility of the thickened slug is properly designed (as in FIG. 1).

C-1 is a region that was by-passed by the chemical slug and now contains by-passed oil, formation water and aqueous liquid from chemical slug (depleted of surfactant and mobility control agent).

Figure 3:

FIG. 3 shows the effects of a frontal advance rate of the mobility control agent exceeding that of the surfactant. In the illustrated performance the mobility of chemical slug is less than the mobility of the flowing oil and water but the frontal advance rate of the mobility control agent in the chemical slug greatly exceeds the advance rate of surfactant. The mobility of the thickened slug is properly designed (as in FIG. 1).

B-1 is a region that was swept by the mobility control agent from chemical slug but was not swept by the surfactant. It now contains by-passed oil and thickened slug. C-1 is a region that now contains by-passed oil and surfactant depleted chemical slug (mobility control agent is present).

Figure 4:
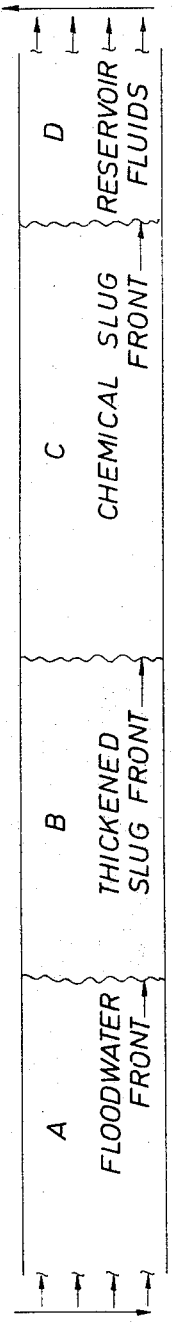
FIG. 4 is a similar illustration relating to the process of the present invention.

FIG. 4 shows the effects of chromatographic balancing in accordance with the present invention. In the illustrated performance the mobility of the chemical slug is less than mobility of flowing oil and water in reservoir and the ratio of the concentrations of the surfactant to the mobility control agent in the chemical slug is adjusted so that the frontal advance rates are equal (slug is chromatographically balanced). The mobility of thickened slug is properly designed (as in FIG. 1). The oil recovery is enhanced.

The following steps, either in the order given or other experimentally acceptable order, comprise one procedure for practicing the present invention:

1. select a surfactant or surfactant mixture which is suitable for a chemical flood application under the conditions existing in the oil reservoir in which the invention is to be practiced. The surfactant or surfactant mixture selected must be one that will dissolve or disperse in water or blends of waters available in the field to be flooded. The solution or dispersion must displace reservoir oil from reservoir rock under the temperature and pressure conditions prevailing in the reservoir to be flooded.

2. from known or measured relative permeability data for the reservoir to be flooded, estimate the water and oil saturations which would exist in the vicinity of an unimpaired well which was producing water and oil in a proportion equal to the proportion of oil and water which would remain in the reservoir pore space after a conventional waterflood. This procedure gives an estimate of the oil and water saturations which would exist in the flowing oil and water bank ahead of a high displacement efficiency aqueous chemical slug which has adequate mobility control and zero frontal lag of both surfactant and mobility control components. Using these oil and water saturations, the appropriate oil and water viscosities and the relative permeability data, estimate mobility in the oil and water bank ahead of the chemical slug.

3. from known or measured effective viscosity data for solutions of the selected mobility control agent in the field water to be used in the chemical slug, determine the concentration of mobility control agent or thickener required to give a solution which when flowing through the reservoir at zero oil saturation would have a mobility substantially equal to or less than the mobility estimated in step 2 for the oil and water bank ahead of the chemical slug. This mobility control agent concentration is a first approximation of the concentration needed in the chemical slug.

Figure 5:
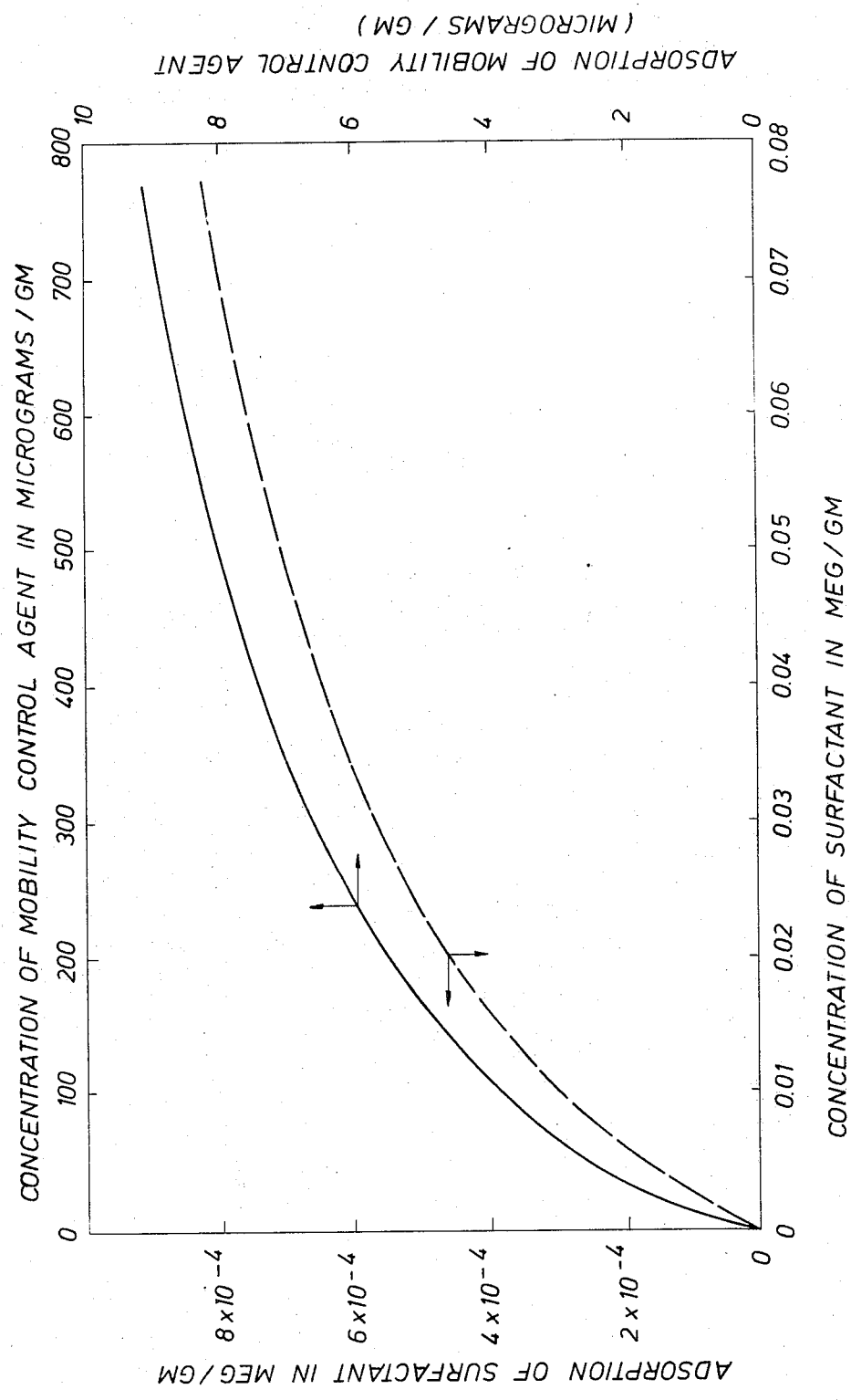
FIG. 5 illustrates a hypothetical adsorption isotherm of a surfactant.
Figure 6:
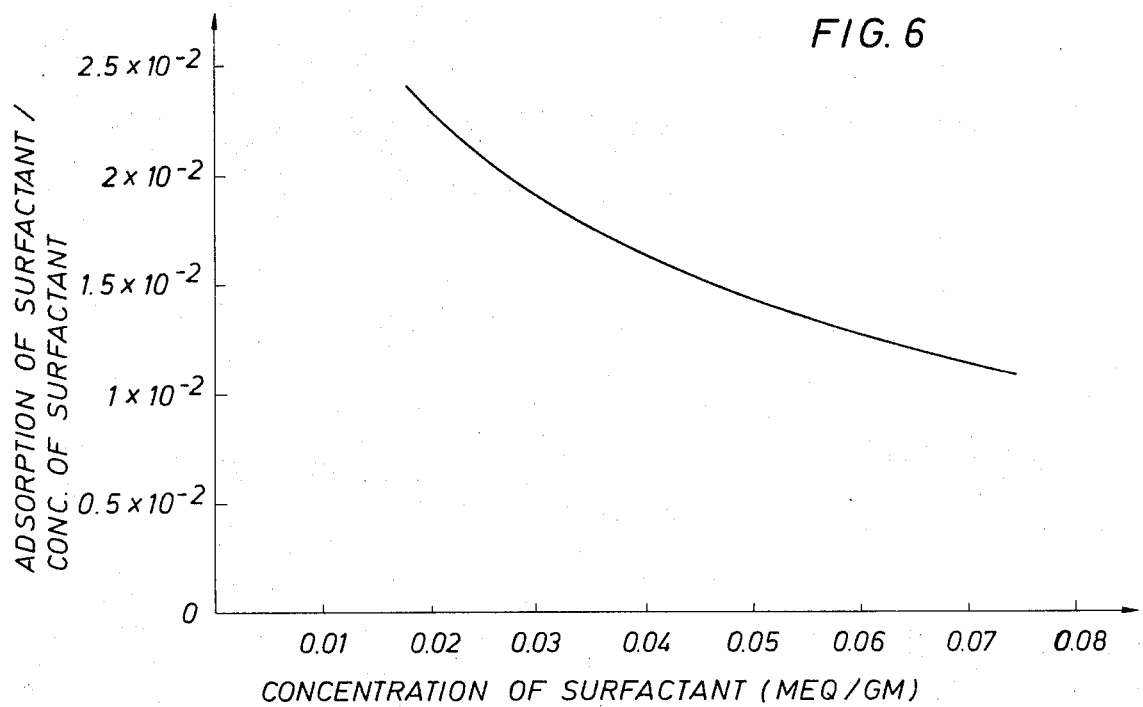
FIG. 6 illustrates the data of FIG. 5 in terms of fractional loss of surfactant with increase in initial concentration.

4. determine adsorption isotherms (at reservoir temperature) for solutions of the selected surfactant mixture in the selected field water and for solutions of the mobility control agent in the field water. From the appropriate isotherms determine the fractional amount of mobility control agent which would be depleted from the mobility control agent solution selected in step 3 when one unit of solution contacts one unit of reservoir rock and select a surfactant concentration which will have the same fractional depletion. The following example illustrates step 4:

a. assume that step 3 indicates that 500 micrograms of mobility control agent per gram of solution will provide adequate mobility control in the chemical slug, b. assume that a plot such as that of FIG. 5 is a plot of adsorption isotherms for the mobility control agent and surfactant in the field water. From the mobility control agent isotherm, it is readily seen that a 500 mg/g solution will lose 8 micrograms of agent to each gram of rock contacted. This amounts to 0.016 (8/500) fraction of the amount present in 1 gm of solution. In FIG. 6 the adsorption data for surfactant that is given in FIG. 5 has been converted to fractional loss data. The data indicates that a fractional surfactant loss of 0.016 would occur when total surfactant concentration is 0.04 meg/gm. Thus, a solution containing 500 mgm/gm of mobility control agent and 0.04 meq/gm of surfactant should be chromatographically balanced if interactions between surfactant and mobility control agent are minor. Prepare this solution and examine it for phase stability, effective viscosity and adsorption of both surfactant and mobility control agent. Compositional adjustments such as may be indicated by this examination should be made.

5. emulsify reservoir crude oil and the surfactant/mobility control agent chemical slug prepared in step 4. Oil fractions whould vary from zero to the level determined in step 2 as the oil saturation in the oil bank flowing ahead of the chemical slug. Observe these emulsions at reservoir temperatures and note the time required for coalesence to occur. If this time is less than about 2 hours, it is unlikely that an emulsion modifier is needed. If the observed emulsions are relatively stable - i.e., do not coalesce in 2 hours more or less, viscosities of the emulsions and of the chemical slug should be determined at reservoir temperature and at shear rates approximating those that will be encountered in the reservoir. If the viscosity of the emulsions is near to, equal or less than the viscosity of the slug, it is unlikely that an emulsion modifier will be needed even if the emulsion is relatively stable.

If, as is frequently the case, any of the emulsions viscosities are several times the viscosity of the slug, it can be anticipated that emulsion will be by-passed by the slug and the process flooding performance will be impaired. To reduce or eliminate this impairment, an emulsion modifier should be incorporated in the chemical slug. Inclusion of such a modifier may require minor readjustment of the ratio of surfactants in certain surfactant mixtures. This readjustment can normally be readily made by those skilled in the art. When an emulsion modifier is required, the amount and type are best determined experimentally for the specific chemical slug/reservoir oil system. Experimental observations should include visual observation for phase stability of the modified chemical slug, visual observation of coalesence time of emulsions of the modified chemical slug with reservoir oil and viscosity measurements at reservoir temperature and shear rate of the modified slug and its emulsions with reservoir crude oil. When the modified slug meets the criteria:

1. single phase at reservoir temperature,
 2. effective viscosity as required (step 2), and
 3. either quick breaking or low viscosity emulsions as set forth above, it should be further evaluated in the performance test given below.

6. further evaluation of either the chemical slug of step 4 or the modified chemical slug of step 5 should be conducted in cores from the reservoir to be flooded. This final evaluation has as its goal (1) confirmation that the chemical slug will displace reservoir oil and water from reservoir rock at reservoir temperature, (2) confirmation that adequate mobility control agent has been incorporated into the slug and (3) confirmation that frontal advance rates of surfactant components and mobility control agent are equal. In general, a selected core is saturated with reservoir water, flooded with reservoir crude, waterflooded to residual oil then flooded with the chemical slug under test. Both waterflood and subsequent chemical flood should be at rates approximating those expected to predominate over most of the field during the chemical flood. Produced fluids, after chemical slug injection starts, are collected in increments and each increment of fluid is analyzed to determine oil cut, surfactant concentration and mobility control agent concentrations. Oil cuts, total produced oil volume and a subsequent analysis of the core for oil provide the data for evaluating the oil displacement capability of the chemical slug. The ratio of concentration of surfactant to concentration of mobility control agent in each produced sample containing these components should be essentially equal to the corresponding ratio of concentrations in the injected fluid if the chemical slug is chromatographically balanced.

Mobility control is evaluated from pressure differential data obtained during the experiment. If a sufficiently long core is used, pressure differential can be measured across individual lineal segments of the core. In this instance and assuming flow has been maintained at a constant rate, the pressure differential across a particular segment of the core (downstream at least one segment from the inflow segment) is measured while oil and water only are flowing. This differential should be substantially equal to or less than the pressure differential across the same core segment after the chemical slug front has passed through the segment and the void volume of the entire segment is filed with chemical slug. When available cores are not long enough to allow measurements of pressure differential across several individual lineal segments, the chemical slug is injected until produced fluids contain no further oil and are at surfactant and mobility control agent concentrations equal to the concentration of injected chemical slug. At this time, the measured pressure differential across the entire core, together with the measured flow rate and known core dimensions are used to calculate the mobility of the chemical slug. This mobility should be less than the mobility calculated in a similar fashion for water flowing through the same core after waterflood and before injection of the chemical slug. The chemical slug mobility should also be less than the mobility of oil and water obtained in step 2.

If the chemical slug does not satisfy the requirements given above, appropriate modification and re-testing is indicated. Such modification will normally be of a minor nature and both the type and extent of such modification will be apparent to those skilled in the art. Examples of such modifications include:

1. The need to increase concentration of mobility control agent as indicated by a chemical slug mobility greater than the mobility of the waterflood at residual oil saturation. Note that increasing mobility control agent would require increasing surfactant concentration to maintain chromatographic stability, and 2. The need to modify the ratio of surfactnat concentration to mobility control agent concentration which would be indicated by the concentration of these respective components in the produced fluids. The controlling relation which must be satisfied is $$C_p/C_s = A_p/A_s \qquad (1)$$

where $C_p$ and $C_s$ are respectively the concentration of mobility control agent and surfactant in the chemical slug. $A_p$ and $A_s$ are respectively the amount per unit of rock of mobility control agent and surfactant lost from the front of the chemical slug. Thus, data obtained in the experiment can be used to calculate the extent to which modification is required.

EXAMPLE 1

To demonstrate the effect on performance of chemical slugs which have a varying degree of both mobility and chromatographic instability, a group of 4 Berea cores (10 inches long by 2 inches diameter) were saturated with an aqueous solution containing about 7,700 ppm of total dissolved electrolyte. Approximately 10% of the total dissolved electrolyte was comprised of a mixture of the chlorides of calcium, barium, magnesium and strontium and 90% was sodium chloride. Three of the cores were placed in a vertical position to provide gravity stability during the following floods. The fourth core was run in a horizontal position. Oil saturation was achieved with a flood of a field crude oil. The cores were then flooded with water to residual oil saturation using the water with which the cores were initially saturated. Two hundred parts per million of Pusher 700 (a molecular weight partially hydrolyzed polyacrylamide sold by Dow Chemical Company) was included in the last part of the waterflood for one of the cores. This Pusher-containing solution was injected until Pusher was being produced from the outflow end of the core.

After obtaining the desired mobility data at waterflood residual oil saturation ($S_{or}$), the cores were flooded with a solution containing:

1. 0.034 meq/gm of a sodium petroleum sulfonate (avg. M.W. ≈ 420),
2. 0.008 meq/gm of a ethoxylated alcohol sulfate (Neodol 25-3S),
3. 7,700 ppm dissolved electrolyte as described above, and
4. Pusher 700 in concentrations of zero or 200 ppm.

Three floods were continued until analysis of produced fluids indicated that all of the residual oil has been produced. For these three cores mobility of the slug was determined and the experiment terminated. The experiment in the fourth (horizontal) core was terminated after only 0.9 pore volume of chemical slug was injected. This core was cut into three lineal segments, each lineal segment was cut in half along its horizontal center line and oil saturation was determined for each of the six pieces. Data are summarized in Table 1 and FIG. 7.

| CORE NUMBER | 764 | 765 | 766 | 771 |
|---|---|---|---|---|
| Core Data | Vertical | Vertical | Vertical | Horizontal |
| Porosity, percent | 20.8 | 21.8 | 21.5 | 20.9 |
| Permeability, millidarcies | 710 | 990 | 1000 | 710 |
| Residual oil saturation, percent | 39 | 41 | 34 | 43 |
| | | | 200 ppm | |

| | Water Flood, 7700 ppm TDS plus Electrolyte | Chemical Flood, Surfactant, plus oil production | | |
|---|---|---|---|---|
| | — | 200 ppm P-700 | — | P-700 |
| | — | — | 200 ppm P-700 | 200 ppm P-700 |
| Clean oil, percent of residual | 73 | 62 | 43 | 51 |
| Emulsified oil, percent of residual | 27 | 38 | 57 | 49[1] |
| Injection Volume $V_p$, to Emulsion Breakthrough | 0.95 | 0.8 | 0.70 | 0.75 |
| Mobility of Chemical Flood± Mobility of Preceding Flood | 2.1 | 5.0 | 7.7 | 2.1[2] |

Figure 7:
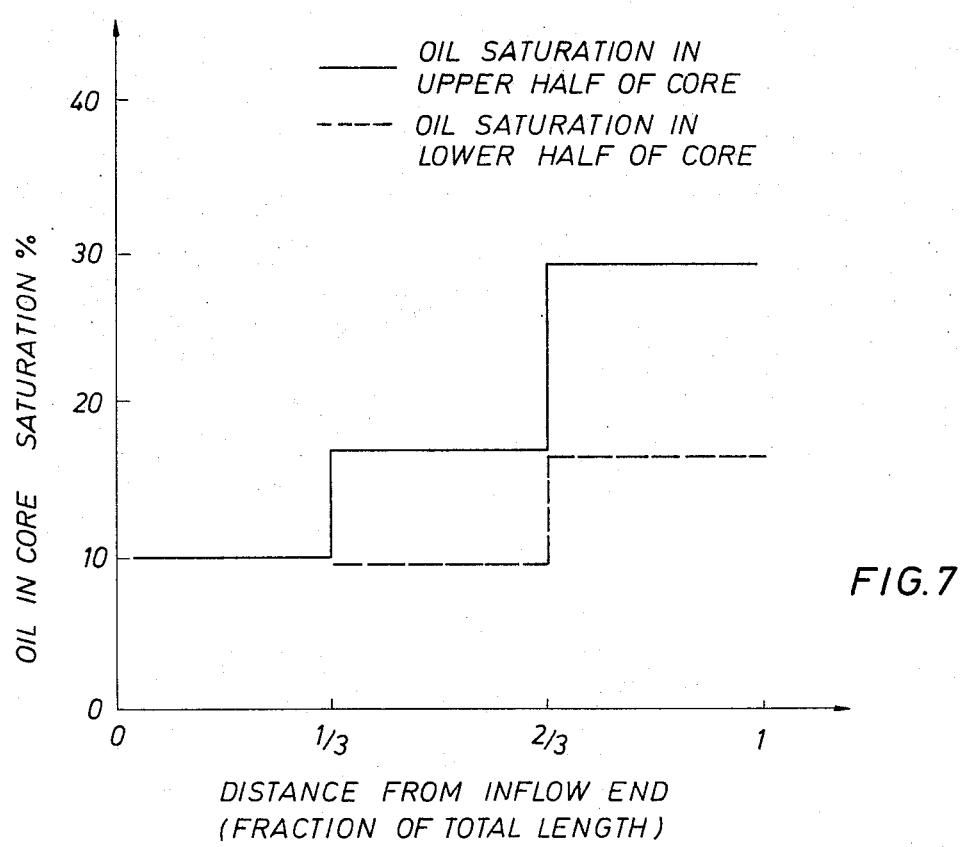
FIGS. 7 and 9 illustrate the variation with distance of the oil saturations in the respective upper and lower halves of water-flooded cores.

(1) Experiment interrupted at 0.9 V injected—See FIG. 7 for Saturation
(2) Assumed equal to 764

The data in Table 1 clearly demonstrate the importance of mobility control in the chemical slug. The chemical flood was unstable in all experiments but a comparison of mobility ratio data with the clean oil recovery for the vertical or gravity stable floods shows a clear trend towards improved clean oil recovery as the mobility ratio decreases toward one. Since emulsion is produced only when some surfactant is being produced, it is clear that more oil is by-passed (either as emulsified oil or free oil) when the surfactant flood is unstable.

In cores 764 and 765, the chemical floods were chromatographically unbalanced with surfactant ahead of the mobility control agents. In 765, no mobility control agent was used and in 764, the concentration of mobility control agent was adjusted to lag behind the surfactant front by about 50 per cent of the distance traveled by the surfactant front. These experiments are model variations of Region C, FIG. 2. They illustrate that at the time of surfactant breakthrough (emulsion produced), more oil has been by-passed (38 per cent of residual) in the experiments with mobility control agent lagging far behind the surfactant front (765) than was by-passed in 764 where mobility control agent lagged behind surfactant by 40 per cent and only 27 per cent of the residual oil was by-passed by surfactant at emulsion breakthrough. Core 766 models a part of the reservoir in which mobility control agent is far ahead of the surfactant (Region C/C-1 of FIG. 3). The data show that mobility control agent ahead of the surfactant results in somewhat poorer mobility control and performance than the case of surfactant ahead of mobility control agent. Fifty-seven per cent of the oil had been by-passed by surfactant at the time of surfactant breakthrough.

The added effect of gravity instability when the chemical slug is both viscously unstable and chromatographically unbalanced is shown by comparison of data for core 764 with the data for core 771. By-passed oil in the gravity stable experiment was 27 per cent at emulsion (surfactant) breakthrough but increased to 49 per cent in the horizontal core. The distribution of by-passed oil in core 771 is shown in FIG. 7 where it is clear that the upper half of the core contained more by-passed oil than the lower half.

In summary, this group of experiments demonstrates that viscously unstable chemical slugs by-pass oil and that these effects are magnified by gravity instability. The experiments illustrating varying degrees of chromatographic imbalance, further show that such chromatographic imbalance must of necessity result in at least a part of the chemical slug being viscoulsy unstable and show that more oil is by-passed as the degree of chromatographic imbalance increases.

EXAMPLE 2

Following step 1 of the procedure outlined above, it was determined that petroleum sulfonate Neodol 25-3S combinations would displace oil from Berea Cores. This was confirmed by Example 1. As described in (2) and (3) of the outlined procedure, it was next determined that 300 ppm (300 micrograms pusher/gm. solution) Pusher 700 in the water described in Example 2 and henceforth called field brine would give a chemical slug mobility approximating 1.4 times the mobility of the oil and water flowing ahead of the slug. Using an acceptable variation of (4), it was determined by analysis of fluids produced from experiments similar to those in Example 1 that the ratio of polymer loss to surfactant loss for systems of this general composition flowing through Berea rock was approximately $10^4$ micrograms of polymer per meq of surfactant. Thus the value of $A_p/A_s$ in Equation 1 is $10^4$ and for the 300 ppm ($C_p$) solution of polymer selected above, equation 1 predicts that a surfactant concentration ($C_s$) of 0.03 meq/gm would provide chromatographic balance between surfactant and polymer.

From experimental observations, it was found that a chemical slug of the following average composition:

| | Meq/gm | Wt % |
|---|---|---|
| Sodium Petroleum Sulfonate (Example 1) | 0.0245 | 2.25 |
| Neodol 25-3S | 0.0055 | 0.4 |
| Pusher 700 | | 0.03 |
| Field brine (Example 1) | | 97.32 |
| $C_p/C_s = 10^4$ microgram/meq. | | | was single phase at the desired reservoir temperature of 95°F. When emulsions of field crude oil and this slug were examined as outlined in (5), it was found that some of the emulsions (varying oil content) were substantially more viscous than the slug and others were only slightly more viscous than the slug. Considering the available data, it was decided to attempt application without the use of an emulsion modifier.

The selected slug was tested according to the procedures given in (6) in short Berea Cores and found to have the expected mobility and to be chromatographically balanced.

The chemical slug developed and tested as given above was applied in an oil recovery process in a two inch diameter by eight foot long Berea core (L-5) having a porosity of 22.2 per cent and permeability of 720 md. The core was (1) saturated with brine, (2) flooded with crude oil, (3) water-flooded with brine to residual oil saturation (35 saturation per cent) prior to applying the chemical recovery process. A volume of chemical slug equal to one fourth the pore volume of the core was injected at a frontal advance rate of approximately one foot/day. The chemical slug was followed by 0.75 $V_p$ (pore volumes) of a 0.03 per cent Pusher 700 solution in an available fresh lake water and this thickened slug was followed by an additional volume of the fresh lake water. These floods were conducted with the core in a horizontal position. After injection of 0.21 $V_p$ of the chemical slug, oil production began. Oil cuts rose rapidly to about 38 per cent and remained high until most of the oil was produced. When the flood was terminated after 1.45 pore volumes of total fluids injected, the oil saturation, determined by core anlysis and material balance of fluids was less than two saturation per cent. Pressure differential data taken across one and two foot lineal increments of the core indicated that the process was, as expected, slightly viscously unstable at the chemical slug/oil bank interface but stable at the thickened slug/chemical slug interface.

Figure 8:
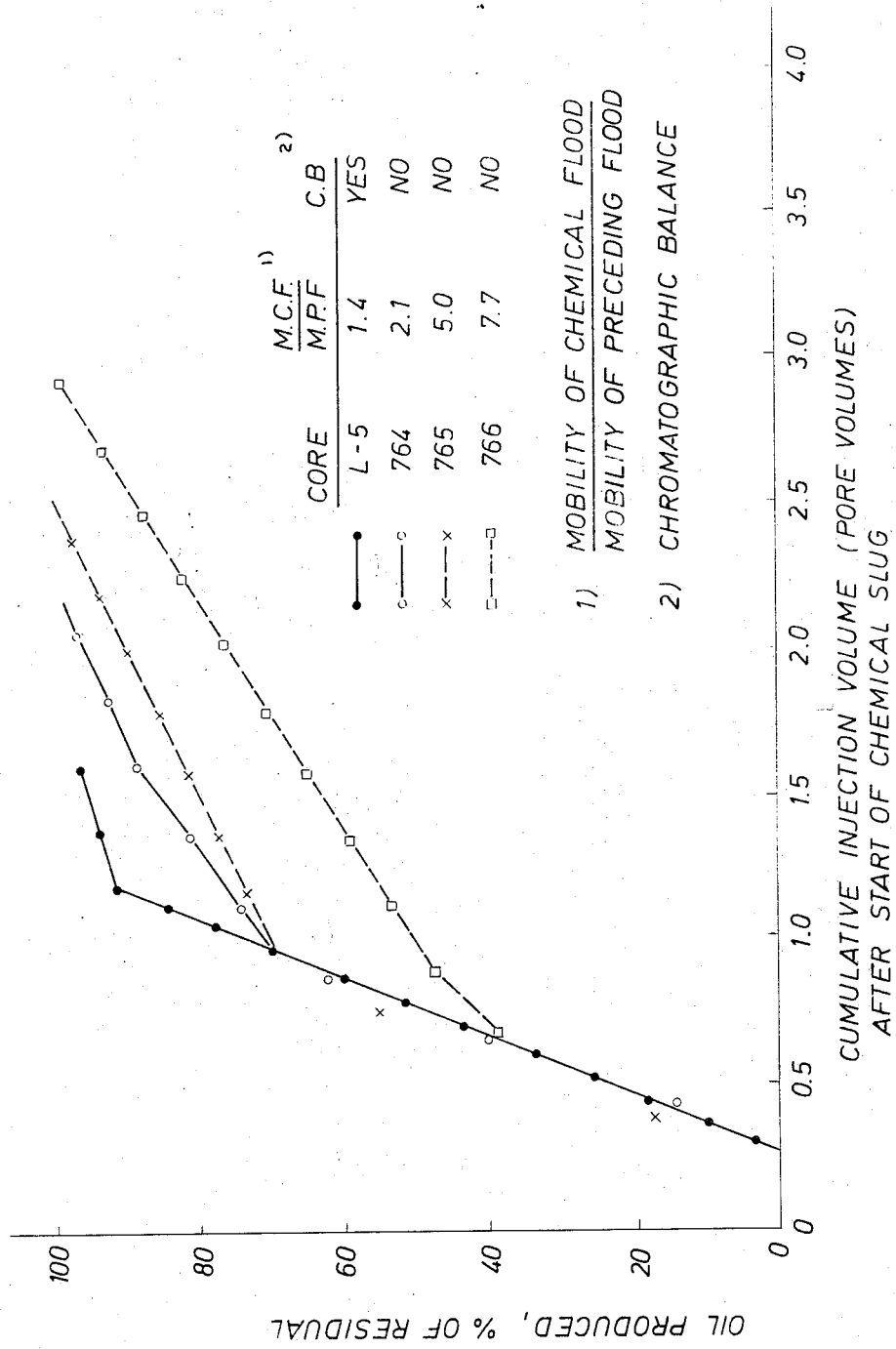
FIGS. 8 and 10 illustrate the proportionate amounts of fluids that are produced from cores by injections of increasing amounts of various chemical slugs.

FIG. 8 compares the oil production performance obtained from Core L-5 with that obtained from 764, 765 and 766 and ilustrates the increasing efficiency of oil recovery as both slug mobility and chromatographic balance are improved. These data show that even though L-5 was horizontal and floods were, therefore, not gravity stable, much less oil was by-passed by L-5 flood than was by-passed in each of the preceding gravity stable floods. Performance of L-5 approaches that which would be expected for a flood which is both viscously stable and chromatographically balanced (FIG. 4).

EXAMPLE 3

A chemical process was formulated from a mixture of sodium petroleum sulfonate having an average molecular weight of 460 to 470 (Shell Chemical Company), an additional sodium petroleum sulfonate having an average molecular weight of 330 to 350 (Pyronate 50 sold by Witco Chemical Co.) and Neodol 25-3S (Shell Chemical Company). Electrolyte components for this flood were approximately the same as those used in Example 1 and 2 but concentrations of the electrolyte components were approximately half that in the preceding examples. Kelzan M, a biopolymer manufactured by Kelco Company was used as mobility control agent. Reservoir temperature was taken as 95°F.

The following outline describes the process development:

1. By evaluation of interfacial activity, it was found that a 50/50 wt/wt mixture of the two sulfonates, in combination with Neodol 25-3S would give the desired oil recovery system.

2. Known relative permeability characteristics of Berea sandstone indicated that a chemical slug viscosity of about 20 to 25 $C_p$ at 95°F and at a shear rate of about 5 sec$^{-1}$ would provide barely adequate mobility control.

3. Viscosity data for Kelzan M solutions in the brine solution to be used in the chemical slug indicated that a minimum of 950 ppm Kelzan M would be required to give a viscosity of 25 $C_p$.

4. Adsorption data for approximate systems indicated that $A_p/A_s$ should be about $10^4$ micrograms/meq.

5. When emulsions of field crude and chemical systems comprising the named sulfonate, Neodol 25-3S, and Kelzan at a $C_p/C_s$ ratio at or near $10^4$ were examined, it was found that emulsions did not break clean for periods exceeding 24 hours and were, in general, several times as viscous as the chemical slug itself. The addition of 4% (wt) of isobutyl alcohol hereafter called IBA resulted in emulsions which were not stable, substantially all of the oil separated from these emulsions in less than 2 hours. Flow tests with systems containing the forementioned surfactants, Kelman M and 4% IBA confirmed that such systems would recover oil but also showed that the ratio $C_p/C_s$ required to give chromatographic balance was $2.7 \times 10^4$ to $2.9 \times 10^4$ rather than the value of approximately $1 \times 10^4$ found for systems without IBA. To provide for a margin of safety in mobility control, chromatographic balance and a sufficiently high total surfactant concentration for efficient oil displacement the following system was selected:

| Component | Avg mol. Wt | Active[1] Ingredient % | Wt % | Meq/gm |
|---|---|---|---|---|
| Petroleum Sulfonate | 460/470 | 62.5 | 1.24 | 0.0175 |
| Petroleum Sulfonate | 330/350 | 50 | 1.24 | 0.0185 |
| Neodol 25-3S | 440 | 59 | 1.0 | 0.0138 |
| Iso Butyl Alcohol | | | 4 | |
| Kelzan M | — | — | 1350 ppm | |
| Total Surfactant | | | | 0.0498 |
| $C_p/C_s$ | | $2.71 \times 10^4$ micrograms/meq | | |

[1] Products of Commerce

The selected system was applied in a 2 inch × 2 inch × 48 inch Berea sandstone block designated as Core 852. This core's porosity was 21.7 per cent and permeability was 855 md. The core was saturated with the designated brine, flooded with oil and waterflooded with brine until no further oil was produced. Residual oil saturation at end of waterflood was 36 saturation per cent. A volume of the selected chemical system equal to 0.35 pore volumes of the core was injected. This chemical slug was followed by a 0.34 pore volume of a thickened slug comprised of 1,500 ppm Kelzan M in the brine used to prepare the chemical slug. The core was horizontal during injection of both slugs. The process was interrupted after 0.69 pore volumes of injection. At this point, 57.4% of the residual oil in the core had been produced. The core was photographed in natural and ultra-violet light, cut vertically and horizontally into segments and extracted to determine oil saturation.

Figure 9:
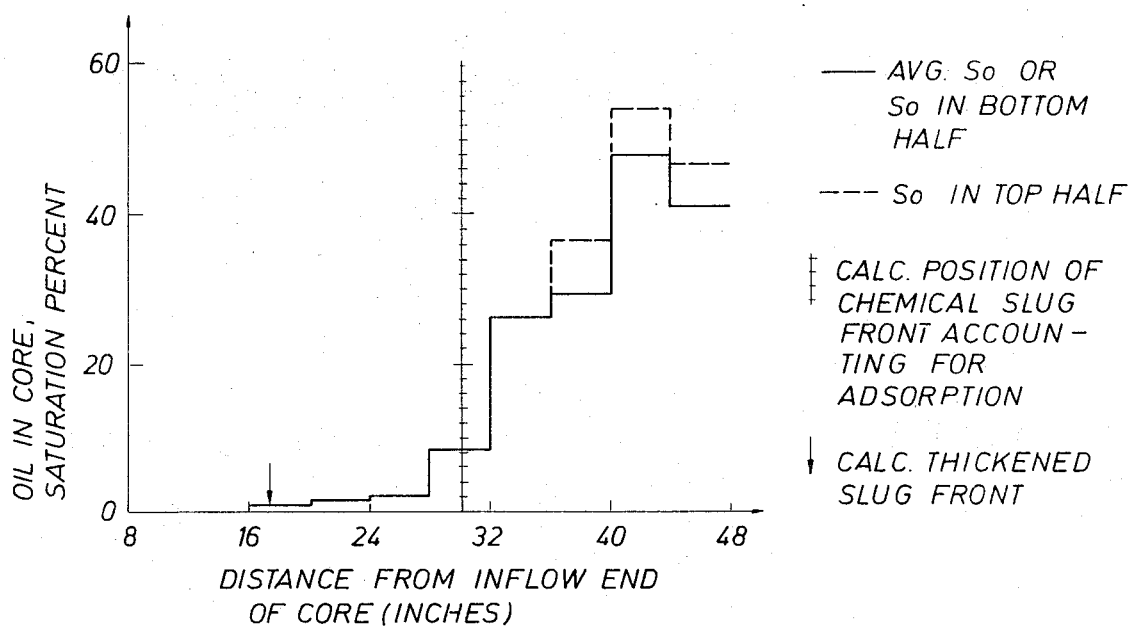

Photographs clearly showed the oil and water bank flowing ahead of the surfactant slug, the surfactant slug itself and the thickened slug. The fronts or interface between thickened slug and chemical slug was essentially vertical with the expected diffuseness caused by dispersion. The interface between chemical slug and oil bank was similarly vertical but gravity segregated flow of oil in the upper half of the core was observed in and ahead of the dispersion zone. These photographic and visual observations are confirmed by the oil saturation data given in FIG. 9. Adsorption of the chemical slug, $A_p$ and $A_s$, determined in development experiments (procedural step 6) were used to calculate the position of the chemical flood front shown in FIG. 9. This front has moved through 30 inches of the core during injection of a total of 0.69 pore volumes of fluid. Since the movement of the front is directly proportional to injection volume, it is easily calculated that the front would have reached the outflow end of the core after 1.10 pore volumes of injection. Oil saturation data in FIG. 9 show that zero oil was by-passed by the slug in the first one-third of the core length. This suggests that the oil shown with the slug may be present as solubilized oil moving with the slug. Assuming the amount of solubilized oil moving with the slug remains constant at the indicated two saturation per cent level gives a predicted recovery in excess of 96% of the residual oil at 1.10 pore volumes of injection.

Pressure differential data obtained across lineal segments of the core show that the chemical slug mobility was about 0.4 times the mobility of the oil bank flowing ahead of the slug. The oil bank mobility was approximately equal to or slightly less than the mobility of the waterflood at Sor.

This example clearly demonstrates, when compared with previous examples, that a chemical slug designed to be viscously stable and chromatographically balanced gives superior performance in oil recovery.

When indicated by emulsion stability and viscosity data, emulsion modifiers can and should be incorporated into the chemical slug.

EXAMPLE 4

A chemical flood process was designed for a reservoir containing residual oil and a brine containing approximately the same proportions of electrolytes but 10 times the concentrations as the field brine of Example 1 and 2. For this application, the following chemical slug formulation was found to be both viscously stable and chromatograhpically balanced.

| Component | Avg mol Wt | Active¹ Ingredient Wt % | Wt % | Meq/gm |
|---|---|---|---|---|
| Petroleum Sulfonate | 460/470 | 62.5 | 2.12 | 0.03 |
| Petroleum Sulfonate | 330/350 | 30 | 3.14 | 0.02 |
| Neodol 25-3S | 440 | 59 | 0.8 | 0.017 |
| Pusher 700 | — | — | 800 PPM | |
| Dowicide G | | | 0.016 | |
| Iso Butyl Alcohol | | | 0.625 | |

$C_u/C_r = 1.2 \times 10^4$ micrograms/meq.

Water used to prepare the slug was identical to that used in Example 3. It was thus about 1/20 the concentration of the brine present in the objective reservoir. Dowicide G was incorporated as a biocide and iso butyl alcohol was incorporated to decrease the breaking time and viscosity of emulsions of the chemical slug and reservoir oil.

The chemical slug was applied in Berea core No. 894. This core was 2 inches in diameter and 20 inches long. Core porosity was 19.5 per cent and permeability was 240 md. Fluids and core were at 95°F and flood rate was set to achieve a flood front advance of about 1 ft. per day. The core was saturated with brine containing 77,000 ppm of total dissolved electrolyte, flooded with oil, and waterflooded to residual oil (Sor = 36 saturated per cent) with the brine with which the core was saturated. The core was clamped in an horizontal position in a constant temperature air bath and chemical flooded with 0.5 pore volumes of the aforesaid chemical slug followed by 1.2 pore volumes of a thickened slug containing 0.05% Pusher 700 and 0.01% Dowicide G dissolved in fresh water.

Chloride ion concentration in the water used to saturate and waterflood the core was 1.275 milliequivalents per gram of solution. The chemical slug itself contained 0.071 meq. chloride ion per gram of solution and the thickened slug contained 0.003 meq/gm. Produced aqueous samples were analyzed for chloride and these data were sued to calculate the per cent of slug water present in the samples. Produced samples were also analyzed for oil, surfactant and selected samples were analyzed for Pusher 700. These data are given in FIG. 10, which illustrates the highly efficient oil recovery achieved with a chemical slug designed according to the present invention to have both adequately low mobility and chromatographic stability.

Figure 10:
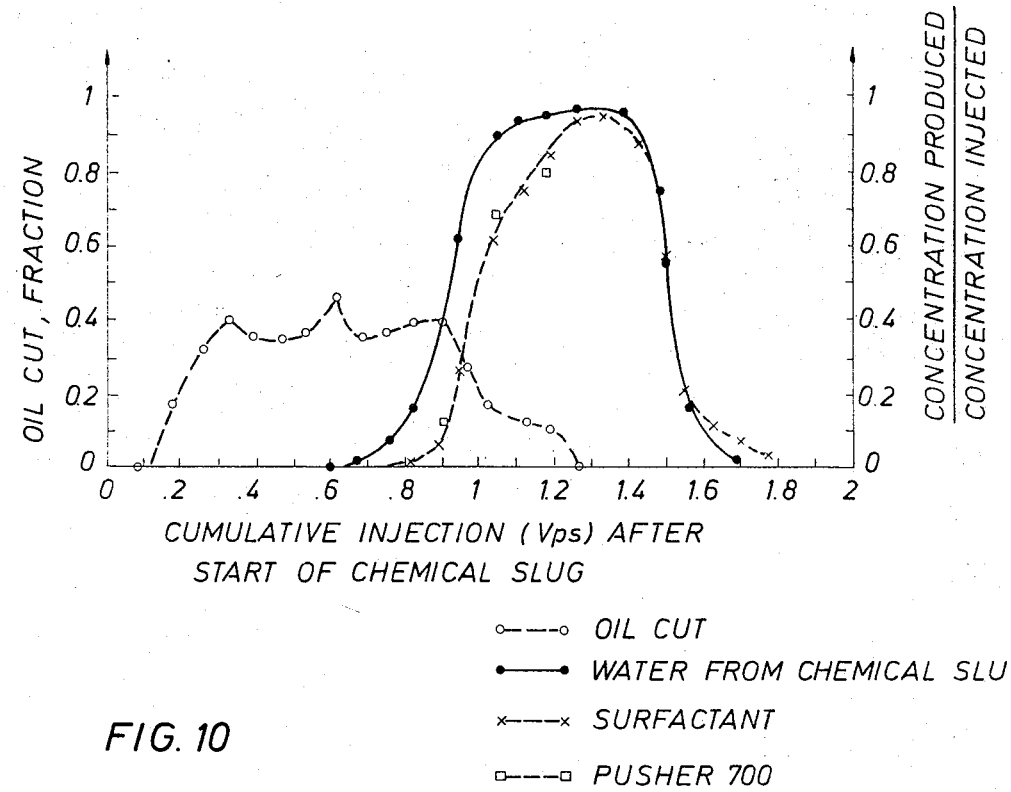

Examination of the data in FIG. 10 shows that oil production started before 0.2 pore volumes of chemical slug injection. Oil cuts rose to about 40 per cent and remained at this level until the first arrival of diluted (mixing zone) chemical slug at 0.9 pore volume injection. As this diluted chemical slug contained only about 100 ppm pusher and 0.007 meq/gm of surfactant, it was more mobile than the oil bank and by-passed some flowing oil. This by-passed oil continued to move out of the production end of the core and was essentially all produced before full concentration viscously stable chemical slug was produced at 1.3 pore volumes of injection. Ninety six per cent of the original residual oil was produced by 1.22 pore volumes of injection.

The data in FIG. 10 also shows that the chemical slug was chromatographically balanced. Analytical data for Pusher 700 and surfactant in produced samples show that both lag behind the water used to prepare the chemical slug but most importantly, the pusher and surfactant fronts are almost identical. The lag behind the water front is expected and results from adsorption. For this core, adsorption calculated from the produced sample analysis is 0.00035 meq. surfactant per gram of rock flooded. Adsorption of Pusher 700 is 4.2 micrograms Pusher 700 per gram of rock flooded.

Pressure differential data indicated that the chemical slug mobility was approximately 0.8 times the mobility of oil and water flowing ahead of the full concentration slug. Thus the chemical slug was viscously stable and chromatographically balanced. Its superior performance is apparent.

What is claimed is:

1. In a process for displacing oil within a subterranean oil-containing reservoir by injecting into the reservoir an aqueous liquid containing a surfactant and a thickener, the improvement comprising:

adjusting the composition and concentration of the compenents of said surfactant and thickener-containing aqueous liquid to form an aqueous chemical slug having an interfacial tension of less than about 0.01 dyne per centimeter against the oil in the reservoir;

adjusting the concentration of said thickener to provide a mobility at least substantially as low as that of the oil-containing reservoir fluids; and adjusting the concentration of said surfactant to provide a rate of surfactant frontal advance approximating that of said thickener.

2. The process of claim 1 in which said surfactant and thickener-containing aqueous liquid is injected as a chemical slug preceding a slug of thickened aqueous liquid that precedes an aqueous drive liquid.

3. The process of claim 2 in which the frontal portion of said slug of thickened aqueous liquid has a mobility substantially as low as that of said chemical slug and the trailing portion of said thickened slug has a mobility substantially as high as that of said aqueous drive liquid.

4. The process of claim 1 in which said surfactant contains a mixture of petroleum sulfonates and polyoxylated alcohol sulfate surfactant materials.

5. The process of claim 1 in which said surfactant and thickener-containing aqueous liquid contains a proportion of dissolved electrolyte that enhances the activity of said surfactant.

6. The process of claim 1 in which said thickener is a partially hydrolyzed polyacrylamide.

7. The process of claim 1 in which said thickener is a biopolymer.

8. The process of claim 1 in which said surfactant and thickener-containing aqueous liquid contains an emulsion modifier adapted to facillitate the breaking of oil field emulsions.

9. The process of claim 8 in which said emulsion modifier is iso butyl alcohol.

10. The process of claim 8 in which said surfactant contains a mixture of petroleum sulfonate and polyoxyalkylated alcohol sulfate surfactant materials.

11. The process of claim 8 in which said thickener is a partially hydrolyzed polyacrylamide.

12. The process of claim 8 in which said surfactant and thickener-containing aqueous liquid is injected as a chemical slug preceding a slug of thickened aqueous liquid that precedes an aqueous drive liquid.

13. The process of claim 8 in which said thickener is a biopolymer.

* * * * *

UNITED STATES PATENT OFFICE
CERTIFICATE OF CORRECTION

Patent No. 3,768,560            Dated October 30, 1973

Inventor(s) HAROLD J. HILL and DAVID ROSS THIGPEN

It is certified that error appears in the above-identified patent and that said Letters Patent are hereby corrected as shown below:

Claim 1, line 6, "components" should read -- components --.

Signed and sealed this 23rd day of July 1974.

(SEAL)
Attest:

McCOY M. GIBSON, JR.
Attesting Officer

C. MARSHALL DANN
Commissioner of Patents